US008828892B2

(12) United States Patent
Dong et al.

(10) Patent No.: US 8,828,892 B2
(45) Date of Patent: Sep. 9, 2014

(54) DRYWALL TAPE AND DRYWALL JOINT

(75) Inventors: Jeffrey J. Dong, Oakville (CA); D. Geraint Roberts, Holden, MA (US); Garry William Morris, Welland (CA); Glenn Stevens, Shrewsbury, MA (US)

(73) Assignee: Saint-Gobain ADFORS Canada, Ltd., Grand Island, NY (US)

( * ) Notice: Subject to any disclaimer, the term of this patent is extended or adjusted under 35 U.S.C. 154(b) by 1222 days.

(21) Appl. No.: 11/624,393

(22) Filed: Jan. 18, 2007

(65) Prior Publication Data

US 2008/0176469 A1 Jul. 24, 2008

(51) Int. Cl.
*D03D 9/00* (2006.01)
*B32B 5/26* (2006.01)
*E04F 13/04* (2006.01)

(52) U.S. Cl.
CPC ............ *B32B 5/26* (2013.01); *E04F 13/042* (2013.01); *E04F 13/047* (2013.01); *E04F 13/04* (2013.01)
USPC .......... 442/20; 442/26; 442/29; 442/43; 442/54; 442/57; 442/58; 442/337; 52/272

(58) Field of Classification Search
USPC ............ 442/20, 26, 29, 43, 54, 57, 58, 337; 52/272
See application file for complete search history.

(56) References Cited

U.S. PATENT DOCUMENTS

| 4,042,739 A | 8/1977 | Emal et al. |
| 4,808,459 A | 2/1989 | Smith et al. |
| 6,054,205 A * | 4/2000 | Newman et al. .............. 428/221 |
| 7,141,284 B2 | 11/2006 | Newton et al. |
| 2003/0114056 A1* | 6/2003 | Sheely ........................... 442/38 |
| 2003/0181114 A1 | 9/2003 | Newton et al. |
| 2008/0034694 A1 | 2/2008 | Banta |
| 2008/0139064 A1 | 6/2008 | Neill et al. |

FOREIGN PATENT DOCUMENTS

| WO | WO 2004/099529 A1 | 11/2004 |
| WO | WO 2005/058595 | 6/2005 |

OTHER PUBLICATIONS

FibaTape®, Joint Tapes, Product literature, Sep. 13, 2006, 1 pg.
Saint-Gobain Technical Fabrics, Joint tapes, Product literature, Sep. 13, 2006, 1 pg.
Saint-Gobain Technical Fabrics, Glass mat, Product literature, Sep. 13, 2006, 1 pg.
Saint-Gobain Vetrotex, Glass mat, Nonwoven Application, Product literature, Sep. 13, 2006, 1 pg.
Saint-Gobain Vetrotex, Glass mat, Paneling, Product literature, Sep. 13, 2006, pp. 1-5.

* cited by examiner

*Primary Examiner* — Elizabeth Cole
(74) *Attorney, Agent, or Firm* — Abel Law Group, LLP; Robert N. Young

(57) ABSTRACT

The invention pertains to a drywall tape having a nonwoven fabric and a reinforcing scrim, wherein the nonwoven fabric has chopped glass fibers laid flat in the nonwoven fabric, the fibers being substantially straight, random laid and bonded to one another to resist forces exerted in random directions, and the reinforcement scrim has elongated reinforcing strands of low profile thickness joined against a side of the nonwoven fabric, such that the scrim and the nonwoven fabric reinforce each other, and reinforce a joint compound in which the drywall tape is imbedded.

12 Claims, 3 Drawing Sheets

DRYWALL TAPE AND DRYWALL JOINT

FIELD OF THE INVENTION

The invention relates to a drywall tape and a drywall joint having a drywall tape embedded in a drywall compound.

BACKGROUND

A drywall joint refers to a combination of a drywall tape imbedded in a joint compound to repair drywall or to cover an open seam in the drywall. Drywall refers to panels or sections of building materials, including, but not limited to, gypsum board and cement board. The sections of drywall are secured against a framework of vertical studs that have been erected as part of a wall in a building, including a fixed or transportable building. When a drywall ceiling is desired, additional drywall sections are installed against a framework of ceiling joists to provide a drywall ceiling. Narrow openings in the form of seams are visible between opposed edges of the drywall sections, whether the opposed edges meet along the plane of a wall or ceiling or whether the opposed edges meet at an inside corner. Additional openings in the drywall sections are caused by damage to the drywall surface and are in need of repair. Such openings are to be covered by drywall joints, such that the drywall appears to be seamless.

A drywall joint is constructed by hand or by machine. In constructing the drywall joint, the opening is filled with a water containing joint compound, also known as a drywall compound. Nails, screws and like fasteners that secure the drywall sections to the framework are driven into the drywall sections until the fastener heads are recessed below the surfaces of the drywall sections. The fastener heads are covered by the joint compound. While filling the opening, a thin layer of the joint compound is spread a few centimeters wide onto the drywall surfaces adjacent to the filled opening. A length of drywall tape is applied by hand or by machine to bridge across the filled opening and adhere onto the thin layer. The thin layer is at least as wide as the drywall tape to adhere an entire width of the drywall tape to the drywall sections. After drying the thin layer, at least one layer, a second layer, of the joint compound is applied to cover the drywall tape. The second layer is applied, and then spread out, smoothed and shaped with a trowel, referred to as a drywall knife or blade, wielded by hand or by machine, to blend smoothly coplanar with the surfaces of the drywall sections, such that the drywall joint hides the opening, and the drywall sections visibly appear to be seamless. The drywall joint blends smoothly with the surfaces of the drywall sections and is substantially concealed thereby. After drying the second layer, the surface of the joint compound is lightly sanded with fine grit sandpaper to smooth the surface. Alternatively, the sanding operation follows an optional application of joint compound to touch up imperfections in the second layer. Similar drywall joints are constructed to cover openings caused by damage to the drywall.

U.S. Pat. No. 4,042,739 discloses a paper drywall tape having an adhesive on one side of the paper tape. The adhesive is wetted, applied against drywall, and dried. Thus, the drywall tape is directly adhered to the drywall by the adhesive. Once the adhesive is dried, the adhesive becomes impervious to water. When a drywall compound is applied to cover the drywall tape, the water present in the drywall compound has no effect on the adhesive. A paper tape has a desirable, low profile thickness, of approximately 0.25 mm. However, holes through the paper are required to expel air bubbles, which holes reduce the strength of the drywall tape. A top layer of joint compound is applied to cover the paper tape. The paper tape separates the top layer from the remainder of the drywall joint, which prevents the top layer of joint compound from penetrating the paper tape and bonding to the remainder of the drywall joint. The top layer is susceptible to forming a crack over the passage of time. A paper tape is susceptible to mold and mildew growth in a humid environment, such as, in kitchens, bathrooms and rooms below earth grade.

A drywall tape in the form of a mesh or web of high strength fibers is commercially available as Fibatape® self adhesive fiberglass mesh. The mesh or web is porous to the joint compound, which allows a top layer of the joint compound to penetrate through the mesh or web and bond with a remainder of the drywall joint located under the drywall tape. Consequently, a bottom layer and a top layer of joint compound are stronger than if the web or mesh would not allow the joint compound to penetrate through the mesh or web. However, the mesh or web has fibers of about 0.31 mm. thickness or diameter, which is relied upon for fiber strength. Because the web or mesh is thicker than a paper drywall tape of 0.25 mm. thickness, a thicker amount of drywall compound is required to construct a drywall joint that covers the mesh. Further, the joint compound must be applied with sufficient thickness to fill interstices in the thickness of the web. A generous thickness is to be avoided, since a generous thickness produces an undesired, raised bump visible on the surface of the drywall sections. It would be desirable for the drywall tape to have thinner fibers to reduce the thickness of joint compound necessary for covering the fibers. However, thinner fibers have been avoided in the past, since thinner fibers have less strength than thicker fibers and would provide weaker reinforcement of the drywall joint.

Application U.S. 2003-0181114 discloses a drywall tape in the form of a web of high strength fibers, having a water soluble resinous coating thereon. The resinous coating is soluble in a water containing joint compound, and forms an adhesive bond with said joint compound when dried. The adhesive coated fibers resist pull out from the joint compound when dried. To obtain adequate fiber strength, the fibers are thicker than a paper tape. Further, the fibers cross over one another to form fiber crossovers in the web. Such crossovers appear at the web surface such that, when a layer of joint compound is applied to cover the web, the web surface has a bumpy surface texture or topography that impedes the spreading out, smoothing and shaping of the joint compound by use of a trowel. Thus, it would be desirable for the drywall tape to have a surface texture or topography that is substantially free of fiber crossovers that would impede the smoothing and shaping of the surface of the joint compound.

U.S. Pat. No. 6,054,205 discloses a cement board reinforced by embedding a facing sheet between two layers of cementitious material. The facing sheet has an open mesh glass screen and a melt blown polymer web. Formation of the web by a melt blowing process melts the web to form a microporous surface that is water resistant and consequently impenetrable by a cementitious material containing water. Further, a thick layer of cementitious material is applied onto the water resistant surface, which deeply embeds the web, but can not penetrate the water resistant surface or form a bond therewith. The facing sheet is suitable for deep embedment within a relatively thick cement board, but is unsuitable for embedment in a thin layer of drywall compound, since a thin layer would lack penetration of such a facing sheet, and would lack formation of a bond with such a facing sheet.

SUMMARY OF THE INVENTION

The invention pertains to a drywall tape for imbedding in a joint compound to form a drywall joint. According to an embodiment of the drywall tape, a fabric comprises chopped glass fibers, wherein the chopped glass fibers are laid flat in the fabric to comprise a low profile thickness fabric, the chopped glass fibers being substantially straight, randomly laid and bonded to one another to resist forces exerted in random directions, and a reinforcement lattice comprising elongated reinforcing strands of low profile thickness joined against a side of the fabric, such that the lattice and the fabric reinforce each other, and reinforce the joint compound while imbedded in the joint compound.

Further, the invention pertains to a drywall joint having the drywall tape, and to a method of constructing the drywall joint having the drywall tape.

An embodiment of the invention and alternatives thereof will now be described by way of example with reference to the accompanying drawings.

DETAILED DESCRIPTION OF THE INVENTION

Figure 1:
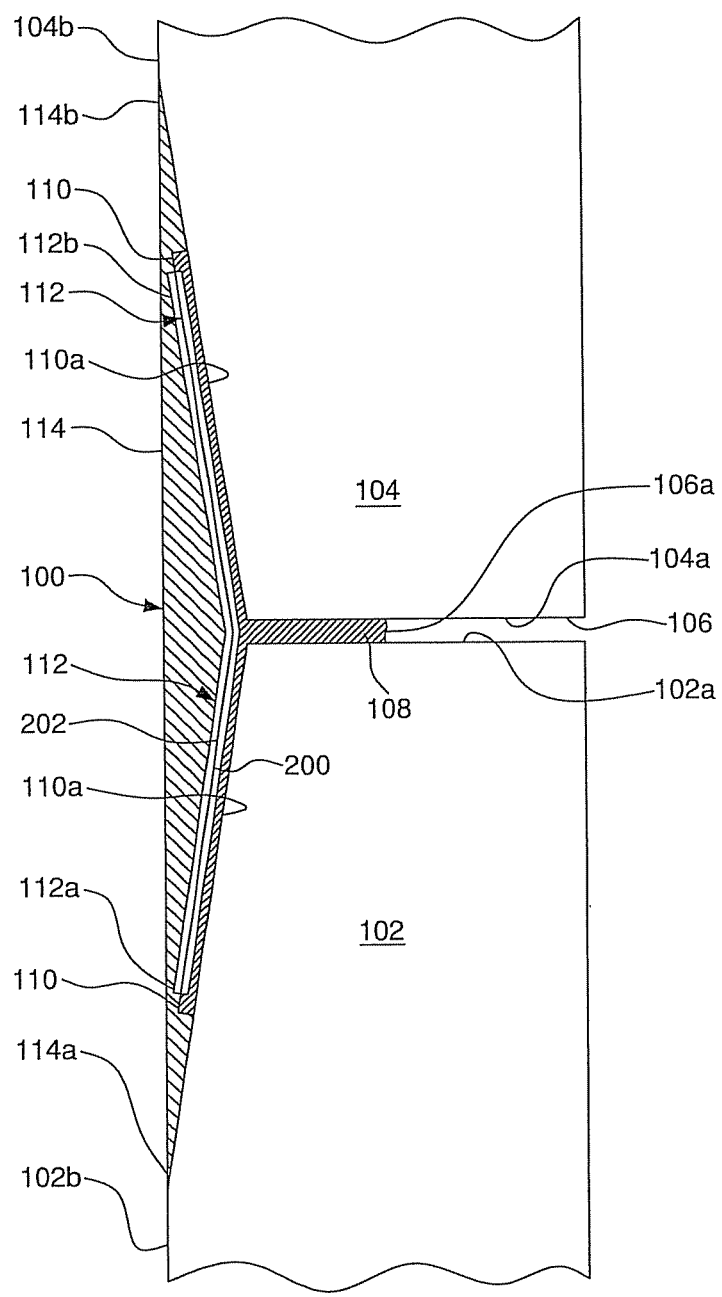
FIG. 1 is a schematic cross section view of a drywall joint at an opening between two drywall sections.

FIG. 1 discloses a drywall joint 100 and two drywall sections 102, 104. A narrow opening 106 in the form of a seam is visible between opposed edges 102a, 104a of the respective drywall sections 102, 104, whether the opposed edges 102a, 104a meet along a plane of a wall or ceiling or whether the opposed edges 102a, 104a meet at an inside corner, not shown, formed by the two drywall sections 102, 104. As shown in FIG. 1, the opposed edges 102a, 104a meet along a plane of a wall or ceiling, and for discussion purposes, are shown without a framework of studs and joists for the wall or ceiling. The opening 106 is covered by the drywall joint 100, such that the drywall appears to be seamless. According to an alternative embodiment, the two drywall sections 102, 104 are deemed to be shown in FIG. 1 as being adjacent to an opening 106 resulting from damage and in need of repair. The opening 106 is covered by the drywall joint 100, such that the drywall appears to be seamless.

The drywall joint 100 is constructed by hand or by machine. In constructing the drywall joint 100, the opening 106 is filled with a first portion 108 of a water containing joint compound, also known as a drywall compound. The wet or fluent joint compound fills the opening 106 by bridging across the opening 106, although a hollow portion 106a of the opening 106 behind the joint compound is permitted. At the time of filling the opening 106, a thin first layer 110 of the joint compound is spread onto the drywall surfaces adjacent to the filled opening 106 using, for example, a 4 inch wide trowel, referred to as a drywall knife or blade, not shown, wielded by hand or by machine. The thin first layer 110 of the joint compound is contiguous with the first portion 108 and overlies the drywall surfaces 102b, 104b of the respective drywall sections 102, 104. The drywall sections 102, 104 are disclosed with tapered surfaces 102b, 104b for purposes of illustration. According to an embodiment of the invention, the surfaces 102b, 104b are untapered, at the choice of a manufacturer. Further, alternatively, one or both of the drywall sections 102, 104 comprise corresponding pieces that have been cut to fit, and which have untapered surfaces 102b, 104b due to being cut to fit. According to another embodiment of the invention, when the opening 106 is caused by damage to the drywall, the untapered surfaces 102b, 104b are likely to occur adjacent to the opening 106.

While the thin first layer 110 is still wet or fluent, a drywall tape 112 is applied by hand or by machine to bridge across the filled opening 106 and adhere onto the thin layer. The thin first layer 110 is at least as wide as the drywall tape 112, and preferably is slightly wider. The first layer 110 adheres the drywall tape 112 to both drywall sections 102, 104. The thin first layer 110 is air dried to solidify the same. After drying the thin first layer 110, a second layer 114 of the joint compound is applied to cover the drywall tape 112. The second layer 114 of joint compound is applied, and then spread out, smoothed and shaped with, for example, a 6-12 inch wide trowel, referred to as a drywall knife or blade, not shown, wielded by hand or by machine, to blend smoothly coplanar with the surfaces 102b, 104b of the drywall sections 102, 104, such that the drywall joint 100 hides the opening 106, and the drywall sections 102, 104 visibly appear to be seamless. Lengthwise edges 114a, 114b of the second layer 114 of the drywall joint 100 extend parallel to the lengthwise edges 112a, 112b of the drywall tape 112. The lengthwise edges 114a, 114b of the drywall joint 100 are tapered by wielding the trowel, to blend smoothly with the surfaces 102b, 104b of the drywall sections 102, 104, such that the drywall joint 100 is substantially concealed thereby. Similarly, the drywall joint 100 described herein is considered to cover an opening 106 resulting from damage to the wall or ceiling fabricated of drywall. The two drywall sections 102, 104 in FIG. 1 are considered as being the damaged drywall sections 102, 104 adjacent to the opening 106 in need of repair.

Figure 2:
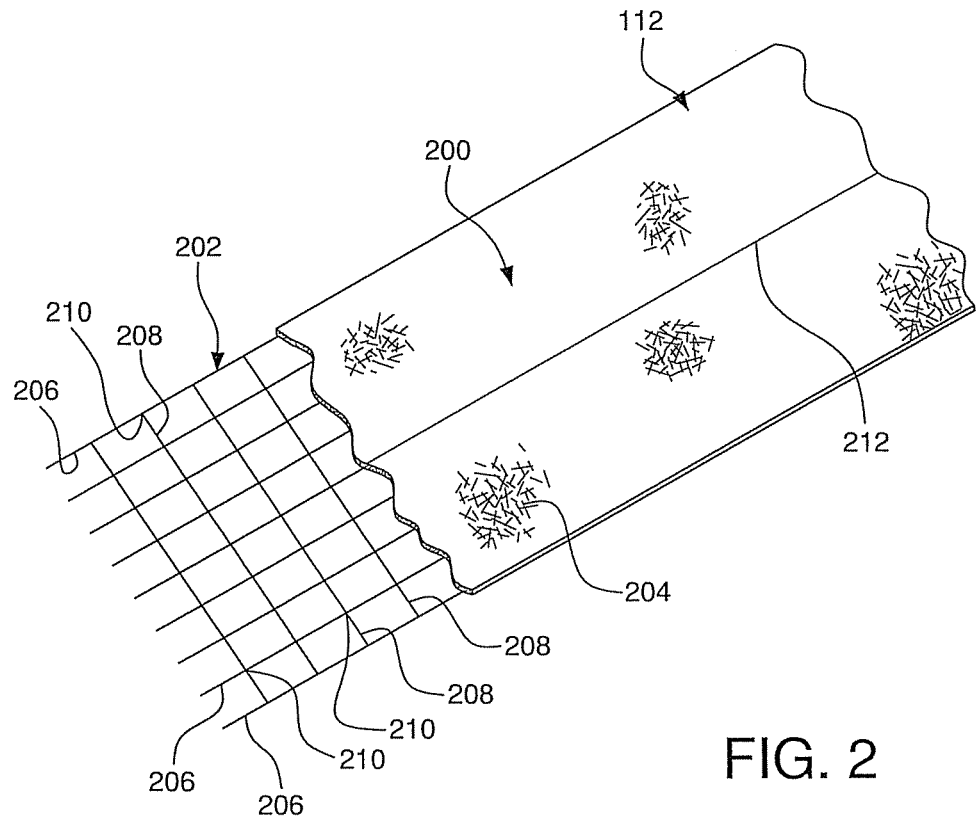
FIG. 2 is a schematic isometric view of a drywall tape having a low profile thickness fabric reinforced by a reinforcement lattice of slender reinforcing strands.

FIG. 2 discloses the drywall tape 112 comprising a bicomponent, low profile thickness fabric 200 the yarns of which comprise chopped fibers 204, preferably fiberglass of 297 Denier or 33-34 Tex and a reinforcement lattice or reinforcement scrim 202 the yarns of which comprise elongated glass strands 206, 208 preferably 297 Denier or 33-34 Tex. The all glass construction is resistant to mold and mildew and is suitable for use in a humid environment of a bathroom, for example. Further, an all glass construction would resist sustaining a burning flame, and would produce a minimum amount of harmful by-products of pyrolysis. The fabric 200 comprises slender chopped glass fibers 204 preferably comprising fiberglass. The chopped fibers 204 are substantially straight and are chopped to relatively short lengths. For example, the lengths correspond to a length range of 2.54 to 5.08 mm. (0.1 to 2.0 inches). After chopping the strands 204 to desired lengths, a resinous binder in a prepolymerized or uncured state, and preferably in a dilute, 20% weight basis solution or mixture with water, is dispersed among the chopped fibers 204. Any of the known binders for joining the fibers of fiber glass insulation are suitable. Then the substantially straight, chopped fibers 204 are randomly laid, meaning that they are randomly arranged lengthwise in random directions, as illustrated schematically at 204 in FIG. 2. Further, the chopped fibers 204 lie flat to define a slender plane or thickness of the fabric 200. The number of chopped fibers 204 that stack one on another is minimized such that the fabric 200 comprises a thin, sheer or gauze as a structural feature, with the straight, slender chopped fibers 204 extending in random directions providing the fabric 200 with a slender thickness dimension, for example, 0.27 mm, and a large population of openings through the fabric 200 to receive and be filled with wet joint compound 108. The straight, slender chopped fibers 204 extending in random directions have a gauze appearance that is different by comparison and contrast with the usual gauze fabric or hosiery fabric that has continuous uninterrupted strands. While the chopped fibers 204 are arranged as described, they are heated, for example, by being passed through a curing oven, or by applying a hot iron, which heats the binder to a melt adhesive state and then polymerizing while under heat to a solid state or fully cured state that adhesively joins the chopped fibers 204 to one another. The solidified, cured binder is then cooled to ambient temperature. Preferably the material composition of the cured binder is water resistant. For example, the binder includes, but is not limited to, urea formaldehyde, styrene butadiene rubber (SBR), polyvinyl acetate (PVA), such as vinyl acetate acrylic, styrene/acrylate, vinyl/acetate, acrylic, styrene acrylic, or copolymers and mixtures thereof. Preferably, PVA is used when activated to an adhesive state by being water soluble, and which hardens when dried to a nonadhesive state. For example, a commercially available fabric 200 comprises Vertex brand of fleece.

The slender fabric 200 by itself is flimsy and susceptible to being damaged before being assembled with a joint compound to form a drywall joint 100. To reinforce the fabric 200, the reinforcement lattice 202 comprises elongated and slender, fiberglass reinforcing strands 206, 208 or yarns of low profile thickness. According to an embodiment of the invention, the strands 206, 208 comprise "150 glass" referring to fiberglass strands of 33-34 Tex. available from Saint-Gobain Vertex, s.r.o. According to embodiments of the invention, the strands 206, 208 are drawn or melt blown mono-filament, or multiple filament yarns of low twist or zero twist to minimize their thickness. Further, the reinforcement lattice or reinforcement scrim 202 is formed with the strands 206, 208, and with 1-6 strands 206 per 2.54 cm. extending in a machine direction, and 1-6 strands 208 per 2.54 cm. extending in a cross direction transverse to the machine direction. According to embodiments of the invention the reinforcement lattice or scrim 202 comprise laid strands, woven or interlaced strands, and are bonded or unbonded at locations where they cross over one another. The interstices between the strands are open to penetration of joint compound. Preferably, the reinforcing strands 206, 208 are nonwoven and are joined by adhesive to one another at crossovers 210 where the cross direction strands 208 and the machine direction strands 206 cross over one another. A binder such as a thermoplastic or a thermosetting resinous adhesive is applied and cured to join the strands together at the crossovers 210. After application, the binder solidifies at or above its curing temperature to become nonadhesive to the touch, while joining the strands 206, 208 at their crossovers 210. According to an embodiment of the invention, the composition of the binder is similar to that of the binder for joining the chopped fibers 204 of the fabric 200 and similar to that of the binder for laminating and joining the reinforcement lattice or scrim 202 and the fabric 200. Further, alternative embodiments of the tape 112 are either uncreased or have a centered lengthwise crease 212 to enable folding to lie against an inside corner between the drywall sections 102, 104.

Figure 3:
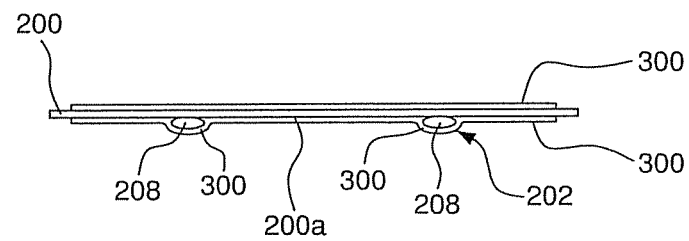
FIG. 3 is a schematic cross section view of an embodiment of a drywall tape.

The reinforcement lattice or reinforcement scrim 202 by itself is flimsy and susceptible to being damaged before being assembled with joint compound to form a drywall joint 100. FIG. 3 discloses an embodiment of the drywall tape 112 wherein the slender fabric 200 and the reinforcement lattice 202 are joined together to reinforce each other, and to reduce the likelihood of being damaged before being assembled with a joint compound to form a drywall joint 100. The reinforcement lattice 202 is secured, preferably, by being adhesively joined against a first substantially planar side 200a of the fabric 200 that will face toward the drywall sections 102, 104. A suitable adhesive composition includes, but is not limited to, acrylate adhesives, e.g., iso-octyl acrylate and acrylic acid copolymer, or vinyl acetate-2 ethyl hexyl acrylate copolymer which can be combined with tackifiers, or vinylidine chloride copolymer with acrylic monomer, a thermoplastic "hot melt" adhesive or phenyl formaldehyde. The adhesive composition in a prepolymerized or uncured state is applied to the lattice 202 by spraying or by a brush applicator or roll applicator.

The chopped glass fibers 204 of the fabric 200 and the yarns of the reinforcement scrim 202 have an abrasiveness, which is an irritant to human skin. According to another embodiment of the invention, the resinous coating 300 comprises a 20% solution of styrene butadiene rubber (SBR) on both sides of the combined scrim 202 and non-woven fabric 200 to provide a thin coating of the SBR, followed by a coating of the adhesive material of the resinous coating 300.

Figure 4:
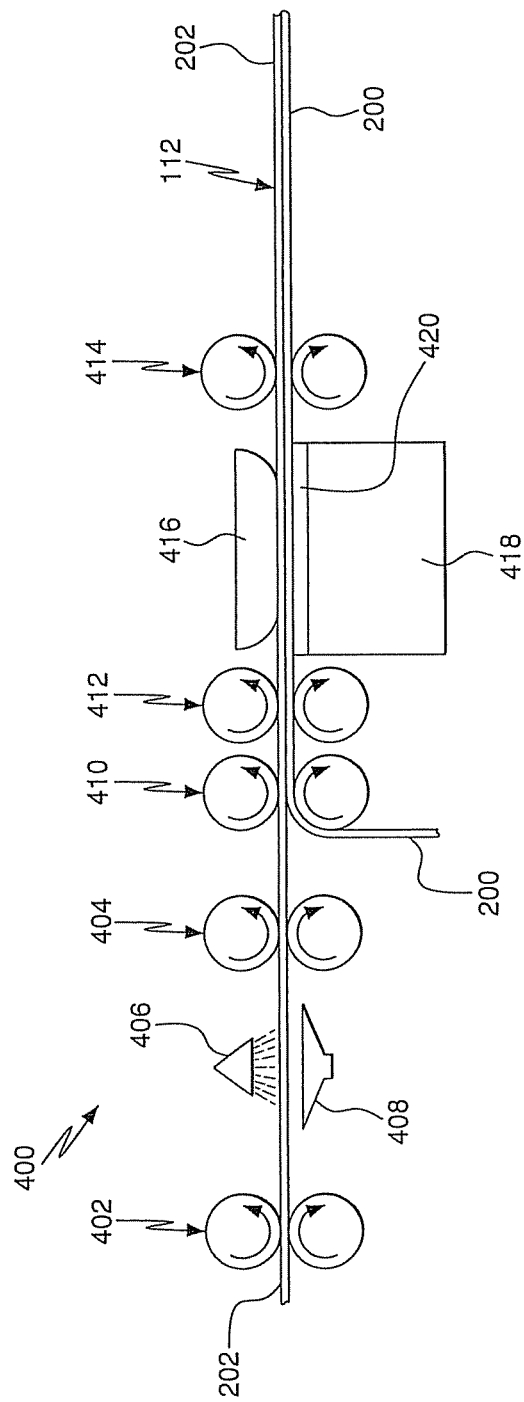
FIG. 4 is a schematic view of an apparatus and system for joining the reinforcement lattice and the fabric to provide a reinforced drywall tape.

FIG. 4 discloses an apparatus and system 400 for joining the reinforcement lattice or reinforcement scrim 202 and the fabric 200, to provide the drywall tape 100, as well as flattening the same to reduce the thickness profile. The reinforcement lattice or reinforcement scrim 202 of continuous length is guided and driven between a first pair of counter-rotating drive rollers 402 and a second pair of drive rollers 404, and is coated with a fluent, uncured adhesive or binder, for example, at an adhesive or binder application station having a sprayer 406 for applying the binder over the lengths of the reinforcing strands 206, 208 and a catch basin 408 to catch excess adhesive or binder. The fabric 200 of continuous length is guided and driven between a pair of drive rollers 410, where the reinforcement lattice or reinforcement scrim 202 and the fabric 200 are laid one on the other, preferably, in a continuous process. Further pairs of drive rollers 412 and 414 drive and guide the overlaid reinforcement lattice or scrim 202 and the fabric through an ironing station where a hot iron 416 is applied to press the reinforcing strands 206, 208 into pressure contact with the fabric 200 against a hot ironing table or platen 418. Although the hot iron 416 and platen 418 are flat, an alternative iron 416 and platen 418 are in the form of rollers, as shown, that press and iron therebetween the reinforcing strands 206, 208 and the fabric 200. The pressure applied by the hot iron 416 and the hot ironing table or platen 418 flattens both substantially planar sides of the reinforcing strands 206, 208, such that wrinkles, undulations projecting outward of the thickness, and free ends of the reinforcing strands 206, 208 projecting outward of the thickness, are flattened. In FIG. 3, the cross sections of the reinforcing strands 206, 208, are flattened to oval shapes, and the cross sections of the chopped fibers 204 of the fabric 200 are flattened to oval shapes, as well, which reduces the profile thickness of the drywall tape 100. Further, the surface topography is smoothed by ironing. A smooth topography and a reduced profile thickness of the drywall tape 100 provides a finished drywall joint with a corresponding reduced profile that is less discernable at the surfaces 102b, 104b of the drywall sections 102, 104. The heat applied by the hot iron 416 and the hot ironing table or platen 418 cures the adhesive or binder, at its curing temperature or above, to maintain the flattened orientations, and to join the full lengths of the reinforcing strands 206, 208 to the surface of the fabric 200. Due to the openings through the fabric 200 and the lattice or scrim 202, the drywall tape 112 is sufficiently flexible to roll up for storage, and to unroll and lie flat during construction of a drywall joint 100. The crease 212 is formed by the hot table or platen 408 having a ridge 420 shown sideways in FIG. 4. The hot iron 416 presses the fabric 200 against the ridge 420 to form a lengthwise crease.

In FIG. 1, during fabrication of the drywall joint 100, the drywall tape 112 is applied to the first layer 110 of wet joint compound with the reinforcing strands 206, 208 facing the first layer 110. Pressure is applied against the drywall tape 112 by hand or by machine to embed the reinforcing strands 206, 208 into the first layer 110 of joint compound. The reinforcing strands 206, 208 and the chopped fibers 204, respectively, have interstices therebetween, which are open to penetration of joint compound, and allow for escape of air out of the drywall tape 112 and out from the first layer 110. Further, the applied pressure sinks the drywall tape 112 and the reinforcing strands 206, 208 thereof in the first layer 110, and forces a mass of joint compound in the first layer 110 to penetrate into the interstices, which reduces or minimizes the thickness and amount of joint compound between the drywall tape 112, the fabric 200 thereof and the reinforcement lattice 202 thereof, and the drywall sections 102, 104. Thereby, the fabric 200 and the reinforcement lattice 202 are adhered by a reduced or minimized, thin first layer 110a, FIG. 1, between the drywall tape 112 and each of the drywall sections 102, 104. Further, thereby, the fabric 200 and reinforcement lattice 202 are brought closer to the drywall sections 102, 104, so as to reside with a low profile height or thickness against the drywall sections 102, 104. The fabric 200 and at least some of the reinforcing strands 208 bridge across the opening 106 and are adhered by the drywall compound to the drywall surfaces 102b, 104b adjacent to the opening 106 to resist cracking of the dried, solidified joint compound. Further, the reinforcing strands 206, 208 are bonded to the chopped fibers 204 of the fabric 200, such that the fabric 200 and the reinforcing strands 206, 208 combine to resist cracking of the dried, solidified joint compound, as well as to reinforce each other and to transfer forces to each other while embedded in the drywall joint 100.

After the first layer 110 of joint compound has dried and solidified, the second layer 114 is applied to penetrate and fill the interstices in the fabric 200 to envelop the chopped fibers 204 and establish a bond therewith when dried and solidified. Air is displaced from the interstices of the fabric 200 by the second layer 114. Moreover, a setting type of drywall compound has a chemical composition that accelerates the rate of drying, and is more suitable for being applied quickly by machine rather than slower by hand. Alternatively, the second layer 114 is applied before the first layer 110 has dried, which is more easily performed by machine rather than by hand.

The second layer 114 of joint compound bonds directly to the previously applied first layer 110 to form a contiguous mass of joint compound that fills, imbeds and bonds with the drywall tape 112. Preferably, at least some portions of the second layer 114 and the first layer 110, respectively, bond to each other within the interstices of the fabric, as well as bond to the interior of the drywall tape 112.

The fabric 200 distinguish from a mesh or web type of drywall tape wherein multiple yarns cross over one another to form a mesh or web, which are referred to as yarn crossovers. Such crossovers are a disadvantage since they increase the thickness of the mesh, which requires an increased thickness of joint compound to fill and cover the mesh. Further, the surface elevation is raised where the yarns cross over one another, which produces a bumpy surface texture or topography that impedes the spreading out, smoothing and shaping of the joint compound by use of a trowel.

In the fabric 200, according to an embodiment of the invention, the chopped fibers 204 are laid lengthwise and flat to define the slender plane of the fabric 200, preferably 0.27 mm. in thickness and to comprise a substantially smooth outer surface of the fabric 200, which surface faces away from the drywall sections 102, 104. A typical denier of the yarn comprises 297 Denier or 33-34 Tex. The outer surface has a surface texture or topography substantially free of fiber crossovers, as would be present in a mesh or web type drywall tape, that would impede the smoothing and shaping of the joint compound by a trowel. The second layer 114 of the joint compound covers the fabric 200 and enters and fills the interstices thereof. The second layer 114 is substantially unobstructed by the substantially smooth outer surface of the fabric 200, while performing a process of covering the drywall tape 112 with a second layer 114 or coating of joint compound, and during a process of smoothing the spread out second layer 114 of joint compound with a trowel and blending the edges 114a, 114b of the spread out joint compound evenly with the drywall surfaces 102b, 104b using a trowel.

The slender strands of the reinforcement lattice 202 and the chopped fibers 204 of the fabric 200 act as a two component combination in the drywall tape 100 to resist forces applied to the drywall joint 100. Since the reinforcement lattice 202 alone is not relied upon to reinforce the drywall joint 100, the strands of the reinforcement lattice 202 are more slender and have a lower thickness profile than a mesh or web type of drywall tape in which the mesh fibers are thick and strong to reinforce a drywall joint 100 by themselves. The scrim or glass mesh of the reinforcement lattice 202 comprises glass yarn preferably of 297 Denier or 33-34 Tex, and 4 ends per 2.54 cm. and 4 picks per 2.54 cm. in the warp and weft, producing a thickness of 0.27 mm. When the 0.27 mm. thickness fabric 200 and the 0.27 mm. thickness reinforcement lattice 202 are laminated together as two components, as disclosed by FIG. 4, the sum total thickness of the two components will assume a compressed thickness of 0.28 mm, which comprises the thickness of the drywall tape 100 due to flattening of the yarns of the two components and curing of the binder to maintain the compressed thickness.

Environmental conditions cause the drywall sections 102, 104 to shift slightly, relative to each other, a phenomenon referred to as racking. Racking exerts forces on the drywall joint 100, and is a cause for cracks to appear in the drywall joint 100. The forces are exerted along any of a number of axes extending in different directions. The fabric 200 embodies an improvement over a mesh drywall tape in which some fibers extend in a machine direction of the mesh, and other fibers extending in a cross direction transverse to the machine direction. The mesh is capable of resisting forces exerted in merely two directions, the machine direction and the cross direction. By contrast, the fabric 200 resists the formation of a crack in the drywall joint 100 that would be caused by racking forces exerted in any of a large number of directions. The fabric 200 is comprised of random laid, chopped glass fibers 204, adhesively joined to one another by a binder, and is substantially isotropic with substantially equal physical properties along all axes in the plane of the fabric 200, to resist racking forces exerted along any of a number of axial directions in the plane of the fabric 200.

FIG. 3 discloses an embodiment of the invention wherein, the reinforcement lattice 202 has a water soluble resinous coating 300 thereon to be solubilized by water contained in the first layer 110 of joint compound, wherein the first layer 110 is dried, and an adhesive bond is formed by contact of the resinous coating 300 with the first layer 110 of joint compound. The adhesive bond is stronger than an adhesive bond formed by the joint compound with an embodiment of the drywall tape 100 without having the resinous coating 300.

The resinous coating 300 is applied after the fabric is laminated with the reinforcement lattice 202, as accomplished by the apparatus 400. An additional sprayer 406 and catch basin 408, not shown, is added to the apparatus 400 to apply the resinous coating 300. Thus, in FIG. 4, the drywall tape 100 is produced as an embodiment without the resinous coating 300. Alternatively, to improve bonding with drywall compound, another embodiment of the drywall tape 100 comprises the resinous coating 300 applied to the drywall tape 100. The resinous coating 300 further reduces skin irritation. The resinous coating 300 is applied to the reinforcement lattice 202 using the sprayer 406 by spraying a 20% weight basis solution or mixture of the resinous coating 300 material in water. The resinous coating 300 comprises polyvinyl acetate homopolymer stabilized in alcohol, or polyvinyl acetate-crotonic acid copolymer. Care is exerted to avoid a thick deposit of the resinous coating 300 material on the fabric 200. The amount of resinous coating 300 is reduced to comprise a coating on the reinforcing fibers. The reduced amount of resinous coating 300 can be solubilized in a small amount of water in the joint compound. Thus, drying of the joint compound occurs quickly in the absence of a high water content, which reduces the manufacturing cost.

According to another embodiment of the invention, both the reinforcement lattice 202 and both sides of the fabric 200 have the water soluble resinous coating 300 thereon. The resinous coating 300 is applied by another sprayer 406 located in the apparatus 400 after joining the reinforcement lattice 202 and the fabric 200 together. The resinous coating 300 is applied to the reinforcement lattice 202 by spraying a 20% weight basis solution or mixture of the resinous coating 300 as a prepolymerized resinous material in water.

The resinous coating 300 is solubilized by water contained in the first layer 110 of joint compound, wherein the first layer 110 is dried, and an adhesive bond is formed by the resinous coating 300 with the first layer 110 of joint compound. The adhesive bond is stronger than an adhesive bond formed by the joint compound with the reinforcement lattice 202 and the fabric 200 without the resinous coating 300. The resinous coating 300 comprises one or more resins selected from the group including: polyvinyl acetate, ethylene vinyl acetate, polystyrene, polyvinyl chloride, polyacrylate, ethylene acetate co-polymer, vinyl-acrylic co-polymer, styrene butadiene, acrylic polymer and starch; protein glues, such as casein, soy protein, animal glue and gelatin; vegetable-based glues, such as cellulosics and their chemically modified derivatives; gums (polysaccharides and carbohydrates) such as guar gum; resins (pine tar) which may not be water soluble; mucilages (agar, carrageenan and algin); inorganics such as soluble silicates (water glass) and cementitious materials (cement, gypsum), and co-polymers and combinations of these. Most preferably, the resinous coating 300 or binder contains polyvinyl acetate (PVAc), such as Vinac 524 polyvinyl acetate homopolymer stabilized with polyvinyl alcohol, or vinyl acetate-crotonic acid copolymer, Airflex 401 polyvinyl acetate/ethylene co-polymer stabilized with polyvinyl alcohol, both supplied by Air Products and Chemicals, Inc., of 7201 Hamilton Blvd., Allentown, Pa. 18195. The resinous coating 300 or binder preferably is provided in an aqueous emulsion or solution containing about 25-75 wt. % solids. Alternatively, water soluble polymers in powder form may be applied with adhesive or electrostatically. Two formulations of the resinous coating 300 developed within the context of this invention are described.

| Formulation 1 | |
|---|---|
| Vinac ® 524 Emulsion (PVAc homopolymer stabilized with polyvinyl alcohol) | 61.38% |
| Airflex 401 Emulsion (PVAc/ethylene co-polymer stabilized with polyvinyl alcohol) | 26.30% |
| Water | 9.02% |
| Urea | 0.25% |
| Hydrocer ™ DP69 (paraffin wax, anti-blocking agent) | 3.00% |
| 900-103 Henkel ® Foamaster ® NXZ mixed 50/50% with water. | 0.05% |

Other pertinent formula data:
Solids level: 50%
Viscosity: about 1000 cps
PH: approximately 6.0

| Formulation 2 | |
|---|---|
| Vinac ® 524 Emulsion (PVAc homopolymer stabilized with polyvinyl alcohol) | 74.53% |
| Benzoflex ® 9-88 (dipropylene glycol dibenzoate plasticizer for PVAc) | 7.23% |
| Urea | 0.25% |
| Hydrocer ™ DP69 (paraffin wax, anti-blocking agent) | 3.00% |
| Water | 14.94% |
| 900-103 Henkel ® Foamaster ® NXZ mixed 50/50% with water | 0.05% |

The anti-blocking agent comprises animal oils, fats, starch, dextrin, silicone oil, waxes and combinations thereof. The preferred anti-blocking agent comprises low melting point paraffin wax. The paraffin wax can be emulsified in the formulations and "blooms" to the surface when the formation dries while on the drywall tape 112. The anti-blocking agent comprises a vapor barrier to deter high ambient relative humidity from wetting the resinous coating 300 during storage. During construction of a drywall joint 100, the anti-blocking agent is dispersed in the water of a drywall compound, while the drywall compound covers the drywall tape 112 and soaks the anti-blocking agent. The anti-blocking agent comprises less than about 5-10% by weight of the formulation so that it can be dispersed readily in the water in the joint compound. Accordingly, the above formulations containing an anti-blocking agent and PVAc resin in solution, is capable of being vapor resistant when dry, but is water soluble or dispersible when contacted with liquid water in the joint compound.

The fibers 204 of the fabric 200 are made softer to the touch by the resinous coating 300 on the fibers of the fabric 200, which reduces abrasiveness or irritation to the human skin. In another embodiment of the invention, the glass strands are made softer to the touch by spraying a 20% solution of styrene butadiene rubber (SBR) to provide a thin coating on both sides of the fabric 200, followed by a coating of the water soluble resinous coating 300 over the SBR coating.

EXAMPLE I

First Samples: A reinforcement scrim 202 has 150 glass, 4 ends CD and MD, with Vinac® 521 binder on glass only. A fabric 200 comprises a fleece, namely Vertex AG-30 fleece available from Saint-Gobain Vertex, s.r.o. The term "AG 30" refers to 30 g/m² gram weight. Laminated glass scrim 202 to fleece fabric 200 with hot iron while binder was still wet. Drywall joints were constructed using USG (United States Gypsum Company) standard drywall joint compound reinforced with the samples of fabric 200 and scrim 202. A "first to crack" test was performed on the solidified joints reinforced with the samples. First crack average value for six joints tested resulted in a first crack appearing at an applied force of 0.975 KN (KiloNewtons). This compares to the first crack appearing in a drywall joint constructed with a drywall tape having an AG-30 fabric alone. The first crack on the AG-30 alone results in the 0.5 KN range. Further, this compares to the first crack appearing in a drywall joint constructed with a normal Fibatape® in the 0.76 KN range. Fibatape® is a glass fiber mesh drywall tape with an adhesive backing.

The terms, "4 ends" or "4×4," refer to 4 strands or ends in the machine direction (MD) and 4 strands or ends in the cross direction (CD) per 2.54 cm$^2$. The term "150 glass" refers to 34 Tex (34 gm./1000 m). "AWH 45" refers to glass strands with a force to break strength of approximately 1 KN. Vinac binder is a vinyl acetate-crotonic acid copolymer obtained from Air Products and Chemicals Company.

Second Samples: 150 glass 4 ends MD and 6 ends CD with Vinac 521 binder on glass only, with AG-30 fleece. First crack First crack average value for six joints tested resulted in a first crack appearing at an applied force of 1.05 KN.

EXAMPLE II

The table, Fleece Tape Trials, comprises the results of fiber break and/or pull out tests performed on the higher strength fleece AWH-45 with a scrim of 4×4 150 glass and Vinac xx240 binder.

| | Fleece Tape Trials<br>Reg. USG drying compound | | | | | |
|---|---|---|---|---|---|---|
| #1 | AWH-45 Fleece | | | | | |
| #2 | AWH-45 Fleece + 4 by 4 150 glass, xx240 binder on glass only | | | | | |
| #3 | AWH-45 Fleece + 4 by 4 150 glass, xx240 binder on glass only | | | | | |
| plate | sample | first crack | ext. | break | ext. | type |
| 1 | #1 | 0.7989 | 367 | | | 0 |
| 1 | #1 | 0.6848 | 0.58 | | | 0 |
| 1 | #1 | 0.6134 | 0.58 | | | 0 |
| 2 | #2 | 1.262 | 1.21 | | | *0 |
| 2 | #2 | 1.242 | 1.25 | | | *0 |
| 2 | #2 | 1.222 | 1.13 | | | *0 |
| 3 | #3 | 1.183** | 1.2 | 1.295 | 1.34 | *0 |
| 3 | #3 | 1.32 | 1.51 | | | *0 |
| 3 | #3 | 1.298 | 1.22 | | | *0 |

**a small crack appeared at 1.183 but the break was higher at 1.295 indicating that it was not in the joint but a flaw in the compound.
pull-out* indicates pull out failure mode "Type" in table, Fleece Tape Trials
delaminate+ indicates no failure mode by delamination was recorded
fiber break O indicates fiber break failure mode "Type" in table, Fleece Tape Trials

| | average | standard deviation | |
|---|---|---|---|
| 1 | 0.699 | 0.094 | AWH-45 |
| 2 | 1.242 | 0.020 | AWH-45 plus 4 by 4 150 glass |
| 3 | 1.267 | 0.074 | AWH-45 plus 4 by 4 150 glass |
| AWH-45 | 1.2545 | 0.050 | |

EXAMPLE III

| | Reg. USG drying compound<br>150 glass Vinac 521 binder on glass only<br>CD 4 & 6<br>MD 4<br>Fleece AG-30 | | | | | | |
|---|---|---|---|---|---|---|---|
| plate# | sample | first crack | ext. | break | ext. | Type | *% |
| 1 | CD-4 | 0.9859 | 1.09 | 1.106 | 1.23 | 0 | 89.1 |
| 1 | CD-4 | 1.077 | 1.08 | 1.077 | 1.08 | 0 | 100 |
| 1 | CD-4 | 1.001 | 0.96 | 1.079 | 1.07 | 0 | 92.8 |
| 2 | CD-4 | 0.9098 | 0.83 | 0.9098 | 0.83 | 0 | 100 |
| 2 | CD-4 | 0.9364 | 0.94 | 0.9839 | 1.04 | 0 | 95.2 |
| 2 | CD-4 | 0.9401 | 0.94 | 1.071 | 1.1 | 0 | 87.8 |
| 3 | CD-6 | 1.071 | 1.06 | 1.185 | 1.22 | 0 | 90.4 |
| 3 | CD-6 | 1.012 | 0.97 | 1.019 | 1.05 | 0 | 99.3 |
| 3 | CD-6 | 1.042 | 0.97 | 1.165 | 1.14 | 0 | 89.4 |
| 4 | CD-6 | 1.055 | 1.23 | 1.221 | 1.42 | 0 | 88.1 |
| 4 | CD-6 | 1.074 | 1.14 | 1.219 | 1.32 | 0 | 88.1 |
| 4 | CD-6 | 1.042 | 1 | 1.188 | 1.19 | 0 | 87.7 |

*reinforcement utilization     *with fiber break only
C—compound     pull-out* (none)
F—fleece     delaminate+ (none)
S—scrim     fiber break O

| plate# | top | bottom | average | standard deviation |
|---|---|---|---|---|
| 1 | | C-F-S-C | 1.02 | 0.049 |
| 2 | | C-F-S-C | 0.93 | 0.017 |
| 3 | | C-F-S-C | 1.04 | 0.030 |
| 4 | | C-F-S-C | 1.06 | 0.016 |

Conclusions: A combination of the softest fleece and 4 ends per 2.54 cm. of 150 glass is better than normal Fibatape® (approx. 27% higher). The tape is applied as you would paper tape. The Vinac 520 binder appears to help the joint. The AG-30 fleece also appeared finer than other fleece samples (giving more glass fibers to reinforce the joint).

The xx240 binder was thinned with water then applied to the fleece and dried in the oven. Adding or subtracting water could control the binder adherence pick up. The sample was within about 20% binder concentration in water. The strengths were better than the samples without the binder on the fleece. The binder must strengthen the compound at the actual joint where the fleece bridges the gap. With additional binder the strength may go higher but the cost would also go up. The joint with no binder on the fleece is still a good joint with an average above 0.90 KN. If the fleece is made with xx240 or 520 as a binder at the normal level of about 15%, it may be cost efficient.

| | | | Summary of Results<br>Vinac xx240 and 521 interchangeable different Viscosity | | | | |
|---|---|---|---|---|---|---|---|
| CD ends | MD ends | glass | fleece | binder | no. of samples | | 1st. Crack KN |
| | | | AG 30 | nil | 6 | fully encapsulated | 0.52 |
| dover reg. | dover reg. | Fibatape | | SBR | many | normal method | 0.76 |

-continued

Summary of Results
Vinac xx240 and 521 interchangeable different Viscosity

| CD ends | MD ends | glass | fleece | binder | no. of samples | | 1st. Crack KN |
|---|---|---|---|---|---|---|---|
| dover reg. | dover reg. | Fibatape | | SBR | 6 | fully encapsulated | 0.93 |
| dover reg. | dover reg. | Fibatape | AG 30 | SBR | 6 | fully encapsulated; fleece applied to glued side of Fibatape ® | 1.455 |
| 4 | 4 & 3 | 150 | AG 30 | 240/521 | 30 | applied like paper | 0.916 |
| 6 | 4 | 150 | AG 30 | 521 | 6 | applied like paper | 1.05 |
| 8 | 0 | 150 | AG 30 | 521 | 6 | applied like paper | 1.18 |
| 4 | 4 | 150 | AG 30 | "A" binder | 6 | applied like paper | 0.801 |
| 4 | 4 | 150 | AG 30 | 240 | 3 | 20% xx240 on fleece tape | 1.045 |

EXAMPLE IV

Additional trials were conducted using AWH-45 fleece and 4×4 glass. The addition of the xx240 on the fleece made an improvement. Some pull out occurred on the testing (low binder on the glass) but the results were good. Because the fleece is brittle, fibers adhere to the fingers when handled. An SBR type binder, or a functional coating binder with a softener in it, may improve the brittleness. Because of the random nature of the fleece, a softer binder should not affect the strength, but make handling more enjoyable. With a softer binder, it may be possible to put a crease in the tape for making inside corners.

Fleece Tape Trials
Reg. USG drying compound

1 WH-45 Fleece CD
2 AWH-45 Fleece + 4 by 4 150 glass, xx240 binder on fleece 20-30%
3 AWH-45 Fleece + 4 by 4 150 glass, xx240 binder on fleece 20-30%
4 AWH-45 Fleece MD

| plate# | sample | first crack | ext. | break | ext. | type |
|---|---|---|---|---|---|---|
| 1 | #1 | 1.017 | 1.19 | | | 0 |
| 1 | #1 | 1.018 | 0.89 | | | 0 |
| 1 | #1 | 1.019 | 0.87 | 1.117 | 0.99 | 0 |
| 2 | #2 | 1.429 | 1.37 | 1.527 | 1.5 | *0 |
| 2 | #2 | 1.409 | 1.34 | 1.544 | 1.5 | *0 |
| 2 | #2 | 1.319 | 1.22 | 1.455 | 1.34 | * |
| 3 | #3 | 1.45 | | | | *0 |
| 3 | #3 | 1.501 | 1.53 | | | *0 |
| 3 | #3 | 1.474 | 1.55 | | | *0 |
| 4 | #4 | 1.308 | 1.34 | | | 0 |
| 4 | #4 | 1.356 | 1.47 | | | 0 |
| 4 | #4 | 1.292 | 1.3 | | | 0 |

| | average | standard deviation | |
|---|---|---|---|
| 1 | 1.018 | 0.001 | AWH-45 Fleece CD |
| 2 | 1.386 | 0.059 | AWH-45 fleece 4 + 4 by 4 150 glass, xx240 binder on fleece |
| 3 | 1.475 | 0.026 | AWH-45 fleece 4 + 4 by 4 150 glass, xx240 binder on fleece |
| 4 | 1.319 | 0.033 | AWH-45 Fleece MD | pull-out* indicates pull out failure mode "Type" in table, Fleece Tape Trials
delaminate+ indicates no failure mode by delamination was recorded
fiber break O indicates fiber break failure mode "Type" in table, Fleece Tape Trials The AWH45 fleece soaks up liquids very fast. It may be possible to spray a thin coat of binder thinned with water. the xx240 improved the first crack results.

Fleece with glass yarn update:

Summary of Results
Vinac xx240 and 521 interchangeable different Viscosity

| CD ends | MD ends | glass | Fleece | binder | no. of samples | | 1st. Crack KN |
|---|---|---|---|---|---|---|---|
| | | | AG 30 | nil | 6 | fully encapsulated | 0.52 |
| dover reg. | dover reg. | Fibatape | | SBR | many | normal method | 0.76 |
| dover reg. | dover reg. | Fibatape | | SBR | 6 | fully encapsulated | 0.93 |
| dover reg. | dover reg. | Fibatape | AG 30 | SBR | 6 | fully encapsulated (fleece applied to glued side) | 1.455 |
| 4 | 4 & 3 | 150 | AG 30 | 240/521 | 30 | applied like paper | 0.916 |
| 6 | 4 | 150 | AG 30 | 521 | 6 | applied like paper | 1.05 |
| 8 | 0 | 150 | AG 30 | 521 | 6 | applied like paper | 1.18 |
| 4 | 4 | 150 | AG 30 | "A" binder | 6 | applied like paper | 0.801 |
| 4 | 4 | 150 | AG 30 | 240 | 3 | 20% xx240 on fleece tape | 1.045 |

-continued

Summary of Results
Vinac xx240 and 521 interchangeable different Viscosity

| CD ends | MD ends | glass | Fleece | binder | no. of samples | | 1st. Crack KN |
|---|---|---|---|---|---|---|---|
| 4 | 4 | 150 | AHW 45 | 240 | 6 | xx240 on glass only | 1.2545 |
| | | | AHW 45 | nil | 3 | CD direction (damaged sample) | 0.699 |
| | | | AHW 45 | nil | 3 | MD direction | 1.319 |
| 4 | 4 | 150 | AHW 45 | 240 | 6 | xx240 on fleece tape 20%-30% | 1.421 |
| | | | AHW 45 | nil | 12 | CD direction | 0.996 |

The AWH45 fleece soaks up liquids very fast. It may be possible to spray a thin coat of binder thinned with water. The Vinac xx240 improved the first crack results when also on fleece.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Patents referred to herein are incorporated herein by reference. Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A drywall tape to reinforce a drywall joint, comprising:
a nonwoven fabric component having a first thickness and comprising randomly oriented chopped glass fibers bonded together with a resinous adhesive to resist forces exerted in random directions, wherein the chopped glass fibers are laid flat in the nonwoven fabric;
a reinforcement lattice component having a second thickness and comprising elongated reinforcing strands and a binder joining the strands;
wherein the fabric component and the reinforcement lattice component are laminated together; and
a thickness of the fabric component and the reinforcement lattice component laminated together comprises a compressed thickness being less than a sum total of the first thickness of the fabric component and the second thickness of the reinforcement lattice component, wherein the compressed thickness is provided by the fibers of the fabric component being flattened to oval shapes, and by the reinforcing strands of the reinforcement lattice component being flattened to oval shapes.

2. The drywall tape of claim 1 wherein the nonwoven fabric has a nonwoven outer surface with a surface texture substantially free of fiber crossovers that would impede smoothing and shaping of the joint compound.

3. The drywall tape of claim 1 wherein the nonwoven fabric comprises interstices between the chopped glass fibers open to penetration and filling by the joint compound, such that a thickness of the joint compound is reduced by a portion of the joint compound penetrating and filling the interstices.

4. The drywall tape of claim 1 further comprising:
a water soluble resinous coating on the reinforcement scrim, the resinous coating facing toward the joint compound, for being solublized by water contained in the joint compound, and for forming an adhesive bond with a first layer of the joint compound.

5. The drywall tape of claim 1 further comprising:
a water soluble resinous coating on both of the substantially planar sides of the nonwoven fabric, the resinous coating facing toward the joint compound on both substantially planar sides of the nonwoven fabric, for being solublized by water contained in the joint compound, and for forming an adhesive bond with the joint compound.

6. The drywall tape of claim 1 further comprising:
a resinous coating on both sides of the nonwoven fabric to reduce abrasiveness of the chopped glass fibers.

7. A drywall joint comprising:
a joint compound substantially filling an opening between opposed edges of drywall sections;
a thin first layer of the joint compound contiguous with the first portion and overlying drywall surfaces of the drywall sections adjacent to the opening;
a drywall tape over the opening and adhered to the first layer of the joint compound, the drywall tape comprising a nonwoven fabric component having a first thickness and comprising randomly oriented chopped glass fibers bonded together with a resinous adhesive to resist forces exerted in random directions, wherein the chopped glass fibers are laid flat in the nonwoven fabric, a reinforcement lattice component having a second thickness and comprising elongated reinforcing strands and a binder joining the strands, wherein the fabric and the reinforcement lattice are laminated together, and a thickness of the fabric component and the reinforcement lattice component laminated together comprises a compressed thickness being less than a sum total of the first thickness of the fabric component and the second thickness of the reinforcement lattice component, wherein the compressed thickness is provided by the fibers of the fabric component being flattened to oval shapes, and by the reinforcing strands of the reinforcement lattice component being flattened to oval shapes;

the nonwoven fabric having interstices between the fibers being open to penetration by the first layer of the joint compound, such that the thickness of the first later of the joint compound between the nonwoven fabric and the drywall sections is reduced by penetration of the first layer of the joint compound into the interstices; and a second layer of the joint compound filling the interstices and covering the nonwoven fabric.

8. The drywall joint of claim 7, further comprising:

the nonwoven fabric having a nonwoven outer surface with a surface texture substantially free of fiber crossovers that would impede smoothing and shaping of the joint compound.

9. The drywall joint of claim 7, wherein at least some portions of the second layer and first layer, respectively, bond to each other within the interstices of the nonwoven fabric.

10. The drywall joint of claim 7, further comprising:

a water soluble resinous coating on the reinforcement lattice, the resinous coating facing toward the joint compound, and being solubilized by water contained in the joint compound, and forming an adhesive bond with the first layer of the joint compound.

11. The drywall joint of claim 7, further comprising:

a water soluble resinous coating on both sides of the nonwoven fabric, the resinous coating facing toward the joint compound on both sides of the nonwoven fabric, and being solubilized by water contained in the joint compound, and forming an adhesive bond with the joint compound.

12. The drywall joint of claim 7, further comprising:

a resinous coating on both sides of the nonwoven fabric to reduce abrasiveness.

\* \* \* \* \*

UNITED STATES PATENT AND TRADEMARK OFFICE
CERTIFICATE OF CORRECTION

| | | |
|---|---|---|
| PATENT NO. | : 8,828,892 B2 | Page 1 of 1 |
| APPLICATION NO. | : 11/624393 | |
| DATED | : September 9, 2014 | |
| INVENTOR(S) | : Dong et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1806 days.

In the Claims:

Column 17, line 6, Claim 7 please delete "later" and insert therefor --layer--.

Signed and Sealed this
Seventeenth Day of May, 2016

Michelle K. Lee
*Director of the United States Patent and Trademark Office*